United States Patent
Batko et al.

(10) Patent No.: US 7,800,873 B2
(45) Date of Patent: Sep. 21, 2010

(54) GROUND FAULT CIRCUIT INTERRUPTOR (GFCI) DEVICE HAVING SAFE CONTACT END-OF-LIFE CONDITION AND METHOD OF DETECTING SAME IN A GFCI DEVICE

(75) Inventors: Thomas James Batko, Wallingford, CT (US); Nelson Bonilla, Tampa, FL (US); Daming Yu, Easton, CT (US); Robert William Youle, Naugatuck, CT (US); John R. Baldwin, Newtown, CT (US)

(73) Assignee: Hubbell Incorporated, Shelton, CT (US)

( * ) Notice: Subject to any disclaimer, the term of this patent is extended or adjusted under 35 U.S.C. 154(b) by 804 days.

(21) Appl. No.: 11/476,199

(22) Filed: Jun. 28, 2006

(65) Prior Publication Data

US 2008/0002314 A1  Jan. 3, 2008

(51) Int. Cl.
*H02H 9/08* (2006.01)
(52) U.S. Cl. ........................................ 361/42
(58) Field of Classification Search ............. 361/42
See application file for complete search history.

(56) References Cited

U.S. PATENT DOCUMENTS

| | | | |
|---|---|---|---|
| 6,111,733 A * | 8/2000 | Neiger et al. ............... | 361/42 |
| 6,262,871 B1 | 7/2001 | Nemir et al. | |
| 6,426,632 B1 | 7/2002 | Clunn | |
| 6,437,700 B1 | 8/2002 | Herzfeld et al. | |
| 6,525,541 B1 | 2/2003 | Leopold | |
| 6,697,238 B2 * | 2/2004 | Bonilla et al. ............... | 361/42 |
| 6,744,254 B2 | 6/2004 | Clarey et al. | |
| 6,807,036 B2 * | 10/2004 | Baldwin ....................... | 361/42 |
| 6,813,125 B1 * | 11/2004 | Ballard et al. ............... | 361/42 |
| 6,828,915 B2 | 12/2004 | Gottlieb | |
| 6,831,819 B2 | 12/2004 | Nemir et al. | |
| 6,864,766 B2 * | 3/2005 | DiSalvo et al. ............... | 335/18 |
| 6,952,150 B2 | 10/2005 | Radosavljevic et al. | |
| 6,958,895 B1 | 10/2005 | Radosavljevic et al. | |
| 6,980,005 B2 | 12/2005 | Finlay, Sr. et al. | |
| 2006/0018059 A1 | 1/2006 | Elms et al. | |

* cited by examiner

*Primary Examiner*—Stephen W Jackson
*Assistant Examiner*—Scott Bauer
(74) *Attorney, Agent, or Firm*—Kevin M. Barner; Mark S. Bicks; Alfred N. Goodman

(57) ABSTRACT

A ground fault circuit interrupting device detects an end-of-life condition. A ground fault detecting circuit detects a fault condition and controllably operates a switching device to energize a circuit interrupting device. An end-of-life detecting circuit detects a failure of the circuit interrupting device to open after detection of the fault condition, and activates a secondary circuit to energize the circuit interrupting device.

23 Claims, 15 Drawing Sheets

GROUND FAULT CIRCUIT INTERRUPTOR (GFCI) DEVICE HAVING SAFE CONTACT END-OF-LIFE CONDITION AND METHOD OF DETECTING SAME IN A GFCI DEVICE

FIELD OF THE INVENTION

The present invention relates to GFCI devices. In particular, the present invention relates to a GFCI device having a safe contact end-of-life condition.

BACKGROUND OF THE INVENTION

GFCI devices are designed to trip in response to the detection of a ground fault condition at an AC load. Typically, the ground fault condition results when a current path is provided between the hot or neutral conductor and earth ground, such as when a person comes into contact with the line side of the AC load and an earth ground at the same time. Such a condition is dangerous and can result in serious injury. Conventional GFCI devices detect this condition by using a sensing transformer to detect an imbalance between the currents flowing in the line and neutral conductors of the AC supply, as will occur when some of the current from either the hot or neutral conductor is being diverted to ground. When such an imbalance is detected, a solenoid activates a latched circuit breaker within the GFCI device to an open condition, thereby opening both sides of the AC line and removing power from the load.

Conventional GFCI devices provide a manual test mechanism. Typically, a manual switch is provided on the face of the GFCI receptacle. When a user presses the switch, current is diverted from the line side to the load side around the sensing transformer, resulting in a current imbalance through the transformer which is sensed. If the GFCI is functioning properly, the ground fault detecting circuit detects the output of the sensing transformer and causes the circuit breaker to open and a reset button to extend from the receptacle face. The user can press the reset button back into the receptacle face to reset the circuit breaker and reconnect the contacts. Users are encouraged to perform a manual test at least once per month, and to replace the receptacle if the unit fails to trip. Unfortunately, many users forget to perform a manual test each month. Accordingly, if any of the components of the GFCI device fail, the user may not be aware that ground fault protection is no longer being provided, and that the GFCI device should be replaced.

More recently, self testing GFCI devices have been provided which periodically and automatically test various components of the device to verify, for example, that the sensing transformer provides an output to the ground fault detecting circuit if an imbalance between hot and neutral conductors exists, that the ground fault detecting circuit provides an output to the circuit breaker tripping device, and that the relay coil of the circuit breaker is not an open circuit (i.e. a broken conductor). This alleviates the problem of users not remembering to manually test the GFCI device. Unfortunately, conventional self testing GFCI devices suffer from other problems. Some designs trip the circuit breaker periodically, causing interruption of power to the load. This is not suitable for use with load equipment which requires continuous power, such as medical equipment, for example.

Other self-testing GFCI devices are designed to test the sensing transformer, the ground fault detecting circuit, the tripping device or the relay coil without actually tripping the circuit breaker and causing an interruption of power to the load. Unfortunately, conventional self testing GFCI devices suffer from disadvantages in that they are unable to detect a failure of the contacts to open if the tested components are functioning properly, such as if the contacts are welded together. Futhermore, such devices may be unable to open the contacts even when a failed component is identified, such as if the tripping device is short circuited.

U.S. Pat. No. 6,262,871 to David C. Nemir, et al., the entire contents of which are hereby incorporate by reference, provides a GFCI device that tests whether the circuit breaker contacts actually open or not, and activates a secondary circuit breaker if the first circuit breaker fails. This provides failsafe operation in the even that the first circuit breaker fails, but the second circuit breaker is still working. Unfortunately, this solution adds components, complexity and cost to the GFCI device, and as a result, users may select other, cheaper models.

Accordingly, there is a need for a manual test GFCI device which senses an end-of-life condition of the GFCI, such as if the contacts fail to open after a ground fault is sensed, and activates a secondary circuit to: pen the contacts if the primary tripping mechanism fails.

SUMMARY OF THE INVENTION

Exemplary embodiments of the present invention provide a ground fault circuit interruptor device for detecting an end-of-life condition. The device comprises line side terminals adapted to receive an input power signal, load side terminals connectable to a load, and hot and neutral conductors for connecting respective line side terminals to corresponding load side terminals. A ground fault detecting circuit detects a fault and controllably operates a switching device to energize a circuit interrupting device to open at least one of the hot and neutral conductors upon detection of a fault. An end-of-life detecting circuit detects a failure of the circuit interrupting device to open after detection of the fault, and activates a secondary circuit to energize the circuit interrupting device to open at least one of the hot and neutral conductors if the failure is detected.

The switching device is preferably a silicon controlled rectifier (SCR). The circuit interrupting device preferably comprises a solenoid that is energized with the switching device is turned on. The device preferably comprises contacts that are opened by the circuit interrupting device. The contacts preferably comprise load, line and face contacts that are isolated when open.

The end-of-life detecting circuit preferably comprises an impedance changing device, such as a fuse, connected between the: load-side hot terminal and the load-side neutral terminal when a test switch is closed. The impedance changing device is preferably adapted to change from a low impedance to a high impedance if the failure is detected. The impedance changing device is preferably a fuse that blows if sufficient current passes between the load-side hot terminal and the load-side neutral terminal.

The secondary circuit preferably comprises a bilateral trigger diac in series with an optoisolator. The optoisolater provides a power supply current to the switching device when the diac turns on.

The end-of-life detecting circuit may also comprise a processor adapted to monitor the ground fault detecting circuit and the optoisolator. The processor detects a failure of the circuit interrupting device to open if the state of the optoisolator does not change within a predetermined time after the ground fault detecting circuit detects a fault. The secondary circuit preferably comprises a second switching device connected to an output of the processor and adapted to energize the circuit interrupting device. The processor is preferably adapted to controllably switch the second switching device. The second switching device is preferably an SCR.

Another exemplary embodiment of the present invention is a method of detecting an end-of-life condition in a ground fault circuit interrupting device. The method comprises detecting an imbalance between hot an neutral conductors, activating a switching device to energize a circuit interrupting device to open at least one of the hot and neutral conductors if the imbalance is detected, and activating an end-of-life detecting circuit if one of the hot and neutral conductors fails to open after activation of the switching device. The end-of-life detecting circuit activates a secondary circuit to energize the circuit interrupting device.

BRIEF DESCRIPTION OF THE DRAWINGS

The invention will be more readily understood with reference to the embodiments thereof illustrated in the attached drawing figures, in which.

In the drawing figures, it will be understood that like reference numbers refer to like features, elements and structures.

DETAILED DESCRIPTION OF EXEMPLARY EMBODIMENTS

Figure 1:
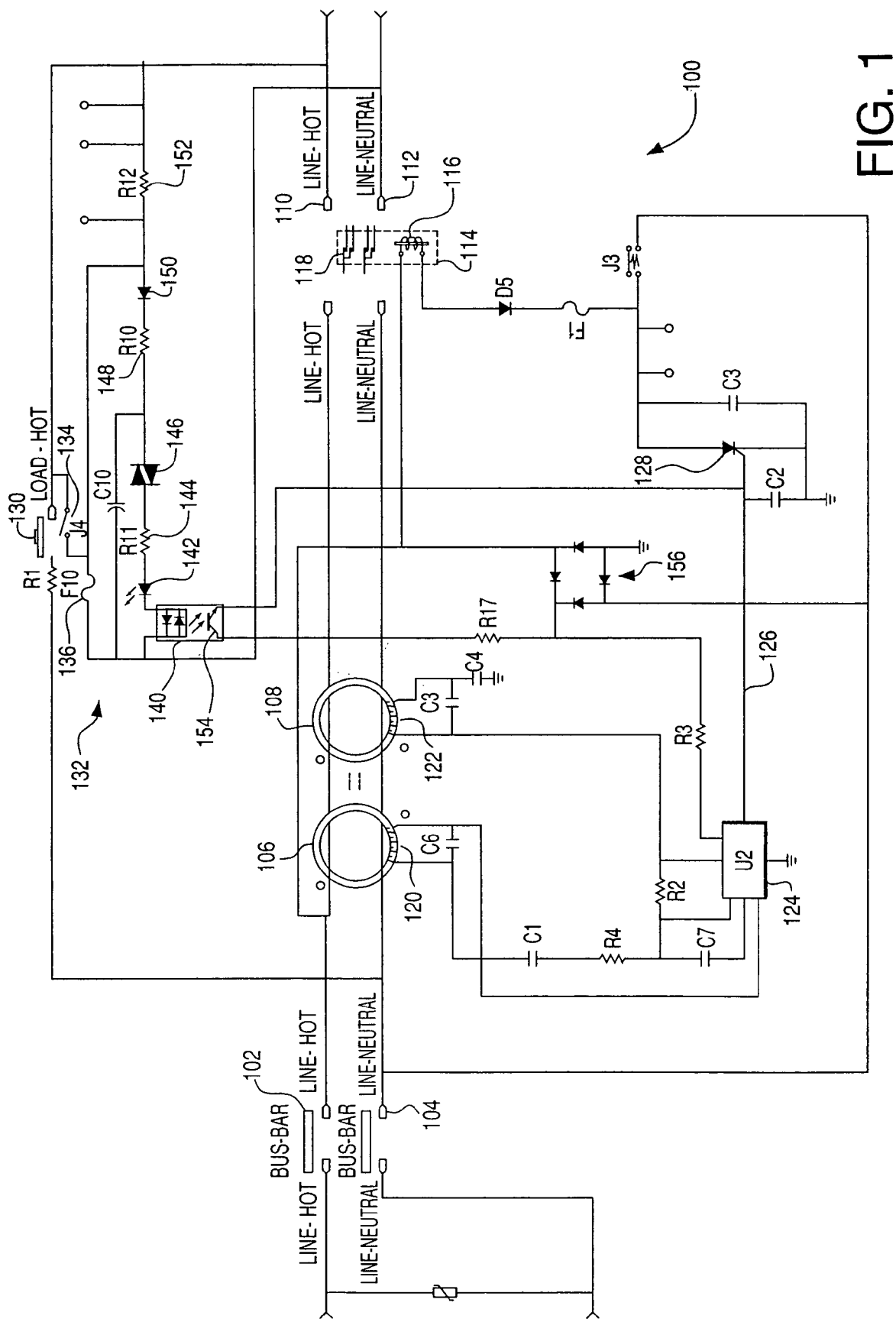
FIG. 1 illustrates a GFCI device according to an exemplary embodiment of the invention.

Exemplary embodiments of the invention will now be described with reference to the attached drawing figures. FIG. 1 illustrates an exemplary GFCI device 100 according to an exemplary embodiment of the invention. First, the GFCI device 100 will be described under normal operation. Power is connected to the GFCI device through two line side terminals, the line hot 102 and line neutral 104 terminals. Two conductors (hot and neutral) pass through transformers 106, 108 and are connected to two load side terminals, the load side hot 110 and load side neutral 112 terminals. A circuit interrupting device 114 is provided to open circuit at least one of, but preferably both, of the hot and neutral conductors. The circuit interrupting device 114 preferably comprises a solenoid coil 116 and relay contacts 118. The GFCI device preferably comprises face contacts for accepting plug blades (not shown), and preferably the relay contacts isolate the line terminals, the load terminals and the face contact terminals. This is preferred so that in the event the device is miswired by an installer, such that power is connected to the load side terminals, power is isolated from the face contacts when the relay contacts are open.

Under normal operation, current passing through differential transformers 106 and 108 is balanced, and secondaries 120, 122 do not generate a voltage. However, in the event of a ground fault, an imbalance of current flowing through either of the transformers 106; 108 generates a voltage in the corresponding secondary 120, 122, that is sensed by a ground fault detecting circuit 124. The ground fault may be real or simulated. GFCI device 100 includes a test switch 130 which when closed provides a path by which current bypasses transformers 106, 108, causing an imbalance and tripping the device. If a ground fault or arc fault is detected by ground fault detecting circuit 124, output 126 is set to a high voltage level to trigger SCR switch 128. When SCR is turned on, current flows from the line side hot conductor, through solenoid 116, and SCR 128 to ground. As a result, solenoid 116 is energized and relay contacts 118 open, removing power from the load and face contacts.

Now an end-of-life condition in GFCI device 100 will be described. On rare occasions, typical GFCI devices can fail, resulting in a loss of protection. Typical failure modes include a shorted SCR and welded contacts that fail to open. Because conventional failed GFCI devices no longer are able to protect users from ground fault conditions, exemplary embodiments of the present invention detect the failure of contacts to open, and activate a secondary circuit to attempt to open the contacts, and place the GFCI device in an end-of-life condition, so that the failed GFCI can be replaced.

In the exemplary GFCI device 100 shown in FIG. 1, end-of-life circuit 132 is provided to detect a failure of relay contacts 118 to open after a fault is detected. The exemplary end-of-life circuit 132 comprises switch 134, fuse 136, capacitor 138, optoisolator 140, LED 142, resistor 144, bilateral trigger diac 146, resistor 148, diode 150 and resistor 152. Under normal (non-EOL-failure) conditions, a small current passes from the load-side hot terminal 110, through resistor 152 and fuse 136 to the load side neutral terminal 112. Fuse 136 is selected such that the small current normally passing through fuse 136 during normal operation does not cause the fuse to blow.

If test switch 130 is pressed and the GFCI device is working properly, test current limited by resistor R1 bypasses transformers 106, 108, and the device trips, removing power from the load side terminals 110, 112. If the device does not trip because of contacts hanging or welded contacts, for example, the user still pressing test switch 130 will close switch 134. This activates the end-of-life detecting circuit 132. If contacts 118 failed to open, then power will still be present on the load side of the device, and current will flow directly from the load side hot terminal 110, through switch 134 and fuse 136 to the load side neutral terminal 112. This large current will blow the fuse 136 if maintained for a sufficient duration. If contacts 118 continue to remain closed after the fuse 136 blows, capacitor 138 charges until triac 146 breaks down, allowing current to flow through the series circuit comprising optoisolator 140, LED 142, resistor 144, diac 146, resistor 148 and diode 150. During each positive half-cycle of power thereafter, diac 146 breaks down and current flows through optoisolator 140.

Optoisolator 140 comprises a transistor 154 which switches to low impedance between collector and emitter when current passes through the optoisolator 140. Transistor 154 is connected between fully rectified diode bridge 156 and SCR 128. Diode bridge 156 rectifies the input power supply from line terminals 102, 104. Thus, when transistor 154 is turned on, a large gate drive is switched to the SCR in an attempt to, open the relay contacts 118.

Once the fuse 136 is blown, the GFCI device 100 is in an end-of-life condition, which is indicated permanently by the LED 142. The user should discard and replace the GFCI device.

Figure 2A:
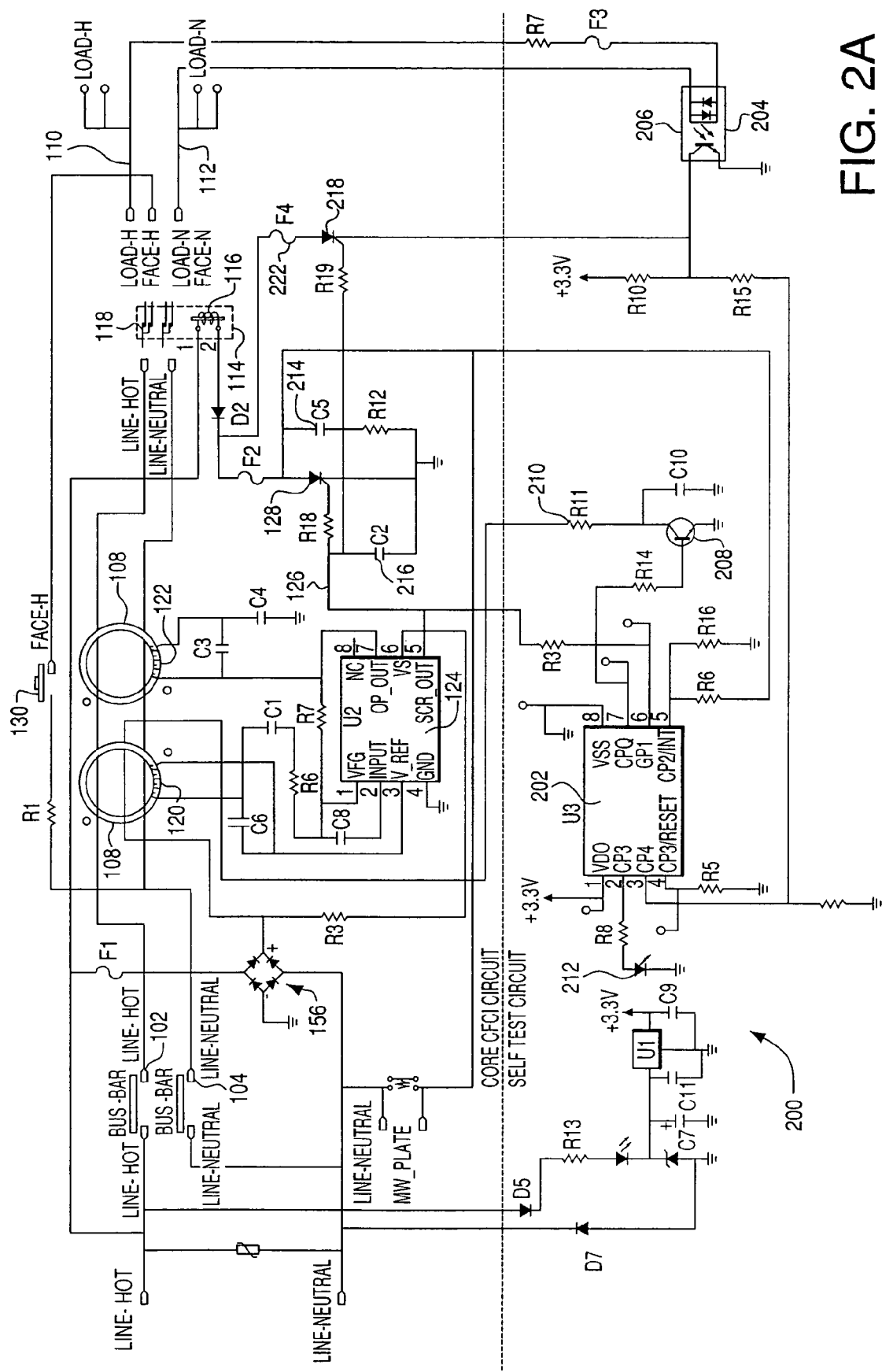
FIG. 2A illustrates a GFCI device having a self-testing ability according to an exemplary embodiment of the present invention.

FIG. 2A illustrates another exemplary embodiment of the present invention. The GFCI device 200 of FIG. 2A includes a processor 202 that is capable of performing self-test operations, to test whether the various functions and components of the GFCI device are functioning properly. The top portion (core GFCI circuit) functions substantially the same as the embodiment described with respect to FIG. 1, with the exception that the EOL board components 132 are omitted.

GFCI device 200 comprises a processor 202 with input/output capabilities. Input GP4 senses the output of optoisolator 204, which is connected to the hot and neutral load terminals 110, 112. Thus, when power is applied to the load terminals, transistor 206 turns on, and input GP4 is pulled to ground. When power is disconnected from the load terminals 110, 112, input GP4 sees 3.3V. Thus, processor 202 can sense, through input GP4, whether relay contacts 118 are open or closed.

Processor 202 input GP1 is connected to the output 126 of ground fault detection circuit 124. Thus, the processor 202 can sense whether the ground fault detection circuit 124 is functioning properly. Processor output GP0 is connected to a transistor 208. When transistor 208 is turned on by the processor, current flows through resistor 210 and transformer 106, simulating a ground fault to be sensed by the transformer 106. Thus, processor 202 can test the response of the ground fault detecting circuit 124 by simulating a ground fault. Output GP5, is connected to an LED 212. Input GP2/INT of processor 202 is connected to the anode of SCR 128 and to a capacitor 214, in order to sense the charge stored in capacitor 214.

Figure 3:
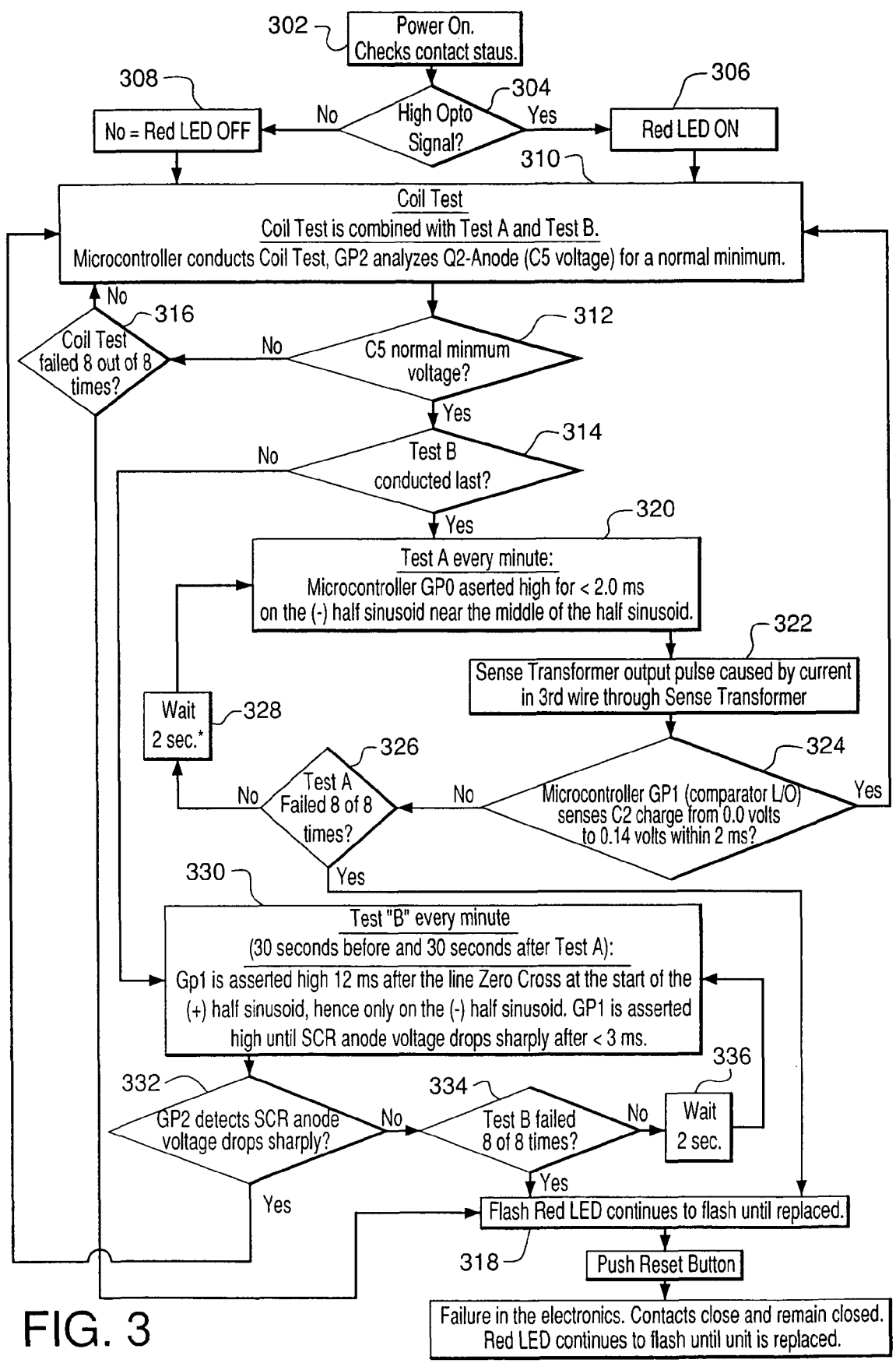
FIG. 3 is a flow chart describing self-test operations performed by an exemplary embodiment of the present invention, as shown in FIG. 2A.

Processor 202 performs a number of tests on the GFCI device 200, which will now be described in greater detail with reference to the flow chart of FIG. 3. Tests A, B, and C, which will be described below are performed periodically to test the relay coil continuity (Test C), functionality of the transformer 106 and ground fault detection circuit 124 (Test A), and functionality of the SCR 128 (Test B). At step 302 the device 200 is turned on. At step 304, the state of optoisolator 204 is checked by the processor 202. A high signal indicates that the relay contacts 118 are closed and power is applied to the load terminals 110, 112. In this case the LED 212 is turned on at step 306. A low signal indicates that the relay contacts 118 are open and power is not applied to the load terminals 110, 112. In this case the LED 212 is turned off at step 308. After step 306 or 306, step 310 is performed, in which relay coil 116 is tested for continuity (Test C). If the relay coil 116 is not broken (open circuited), current will flow from the line terminals 102, 104 will charge capacitor C5 214 each positive half cycle. This charge is sensed at GP2 of the controller 202. If C5 214 has a normal minimum voltage at step 312, this indicates that the coil has continuity and Test C is passed. In this case the processor determines whether Test B was conducted last, at step 314. If test C fails, then at step 316, the processor 202 determines whether the coil test (Test C) has been failed 8 out of 8 times. If not, step 310 is repeated. If so, an end-of-life flag is permanently set, and the LED 212 is flashed permanently until the unit is replaced, at step 318. After step 314, if Test B was conducted last, then Test A is begun at step 320.

Test A is preferably performed once per minute. During Test A, the processor 202 asserts output GP0 to a high voltage for less than 2.0 ms on the negative half-sinusoid of the input power waveform. Transistor 208 turns on and causes an imbalance in transformer 106 (step 322). If the ground fault detection circuit 124 is functioning properly, then the ground fault detection circuit output will charge C2 216 via line 126, which is sensed at input GP1 of processor 202. If Test A passes, then C2 can discharge before the positive half cycle, so that the relay contacts are not opened undesirably. If Test A passes at step 324, then the process returns to step 310. If Test A does not pass, then at step 326, the processor determines if Test A has failed 8 out of 8 times. If not, then the processor waits preferably two seconds at step 328, and then returns to step 320. If Test A fails 8 out of 8 times, then at step 318, an end-of-life flag is permanently set, and the LED 212 flashes permanently until the GFCI device 200 is replaced.

If at step 314, Test B was not conducted last, then Test B is conducted at step 330. Test B tests whether SCR 128 is functioning properly. GP1 is asserted to a high voltage during the negative half cycle. If the SCR is functioning properly, it will turn on and C5 214 will discharge rapidly through the SCR 128. The discharge of C5 at the anode of the SCR is sensed at GP2 of processor 202. If the SCR anode voltage drops sharply at step 332, then Test B passes, and processing returns to step 310. If, however, the anode voltage of the SCR does not drop sharply, then at step 334, the processor 202 determines whether test B has failed 8 out of 8 times. If Test B has not failed eight times, then the processor waits preferably two seconds at step 336, and then Test B is repeated at step 330. If Test B fails eight times in a row, then at step 318, an end-of-life flag is permanently set, and the LED 212 flashes permanently until the GFCI device 200 is replaced.

Once the GFCI device 200 reaches an end-of-life condition, the LED 212 flashes permanently. The LED is preferably red, but any suitable color could be used. If any of Tests A, B, or C fail, then processor 202 sends a signal to open the relay contacts via GP1 to turn on the SCR 128. After this, the relay contacts can be closed again via the manual reset button, but self testing will no longer be performed, and the LED 212 will continue to flash, indicating that GFCI protection is no longer being provided.

Figure 4:
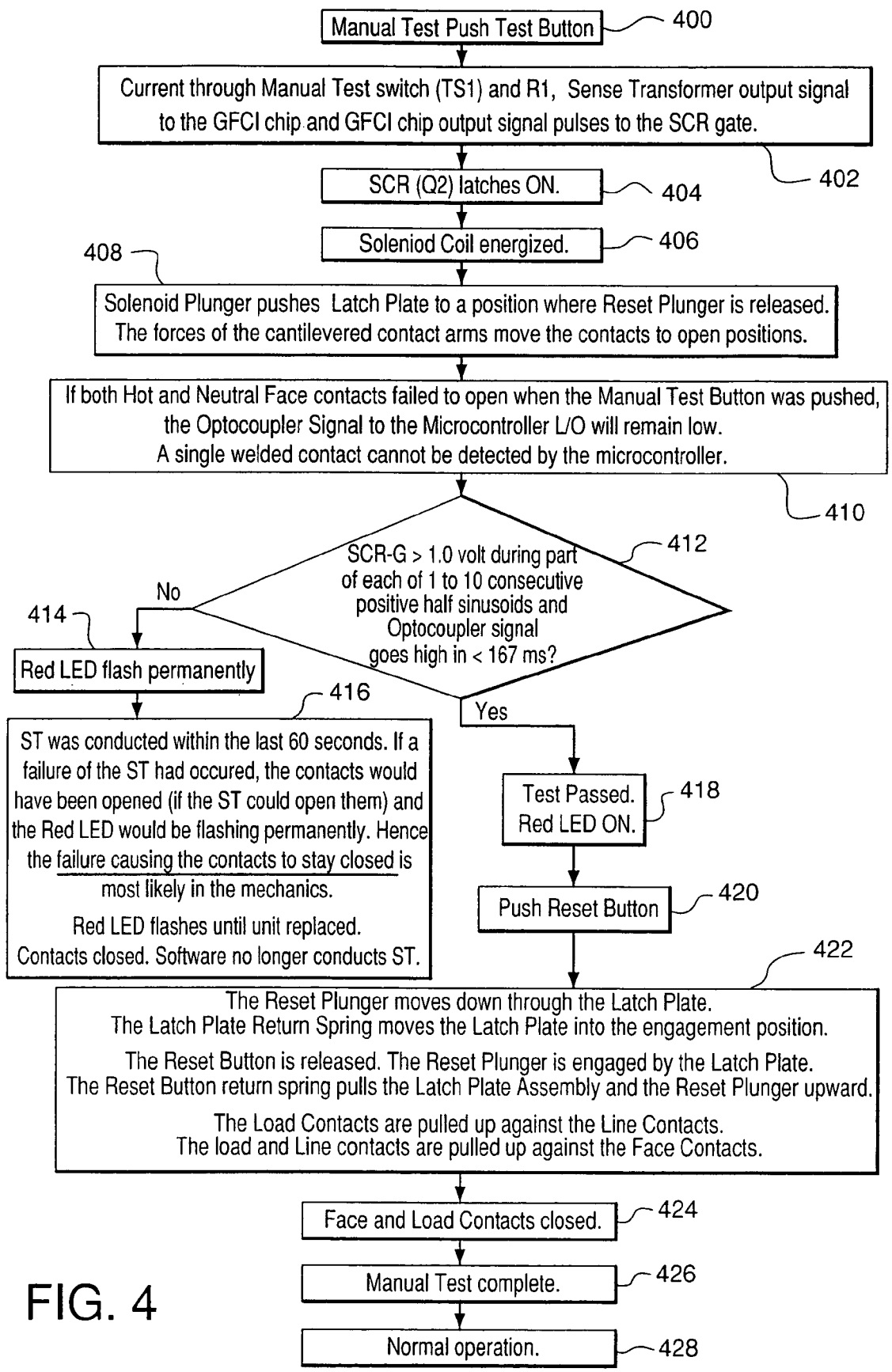
FIG. 4 is a flow chart describing the functionality of the embodiment described in FIG. 2A during a manual self-test or actual ground fault.

The operation of the GFCI device 200 shown in FIG. 2A when a manual test is conducted or an actual ground fault is detected will now be described with reference to FIG. 4. A manual test will be described, but the GFCI device 200 performs substantially the same if an actual ground fault occurs, as the sense transformer 106 cannot distinguish between a manual test and an actual ground fault. At step 400, the manual test button 130 is pressed. Current flows from the line-side neutral conductor 102, through resistor 214 and test switch 130 to the load-side hot conductor 110, bypassing the sense transformer 106. As a result, the sense transformer 106 provides an output signal to the ground fault detection circuit 124. The ground fault detection circuit 124 pulses the gate of SCR 128 through output 126 at step 402. If the SCR 128 is functioning properly, is latches on at step 404. At step 406, the solenoid coil 116 energizes. At step 408, the solenoid plunger pushes a latch plate (not shown) to a position where the reset plunger (not shown) is released. The cantilevered contact arms (not shown) move the contacts 118 to open positions. If the hot a neutral contacts fail to open (due to welding or another fault), the optocoupler signal of optoisolator 204 will remain low because transistor 206 will remain turned on (step 410). At step 412, the processor 202 determines whether the SCR gate 126 was greater than 1 volt during each of ten consecutive positive half sinusoids, and whether the optoisolator signal, as read at GP4, goes to a high voltage within 167 ms. If the optoisolator circuit does go high, then the contacts 118 opened, and the GFCI device 200 functioned properly. If the contacts 118 do not open, the test fails, and at step 414, the LED 212 is flashed permanently, and the end-of-life flag is permanently set to indicate that the GFCI device 200 should be replaced. At step 416, since a self test was conducted within sixty seconds of the manual test and the self test passed, the fault is most likely in the mechanics. Thus, self tests are preferably no longer performed.

Test D tests whether the contacts 118 actually open or not. Test D will now be described. If the manual test is passed, and the contacts actually open at step 412, then at step 418, the LED 212 is turned on steadily, and the end-of-life flag is not set. The reset button can be pressed at step 420 to reset the device, and turn off LED 212. At step 422, the reset plunger moves down through the latch plate. The latch plate return spring (not shown) moves the latch plate into an engagement position. The reset button is released, and the reset plunger is engaged by the latch plate. The reset button return spring pulls the latch plate assembly and the reset plunger upwards. The load contacts are pulled against the line contacts. The load and line contacts are pulled up against the face contacts. At step 424, the face and load contacts are closed. At step 426, the manual test is complete. The GFCI device 200 returns to normal operation at step 428.

If either a manual test or an actual ground fault fails to cause contacts 118 to open, then optoisolator 204 will continue to conduct, and transistor 206 will continue to be turned on. This condition is sensed by input GP4 of processor 202. Output GP1 of processor 202 is connected to the output of ground fault detection circuit 124. This output is also connected to the gate of a second SCR 218. Thus, second SCR 218 provides a second path by which to energize solenoid 116, even under normal operating conditions, but advantageously, it provides a second conduction path to energize solenoid 114 in the event that SCR 128 fails. Fuses 220, 222 are preferably provided to protect the solenoid 116 in the event of a short circuited SCR 128, 218. Thus, by providing two conduction paths by which to energize solenoid 114 (through SCR 128 or through SCR 218), device 200 provides additional robust operation, even in the event of a failed SCR or blown fuse.

Figure 2B:
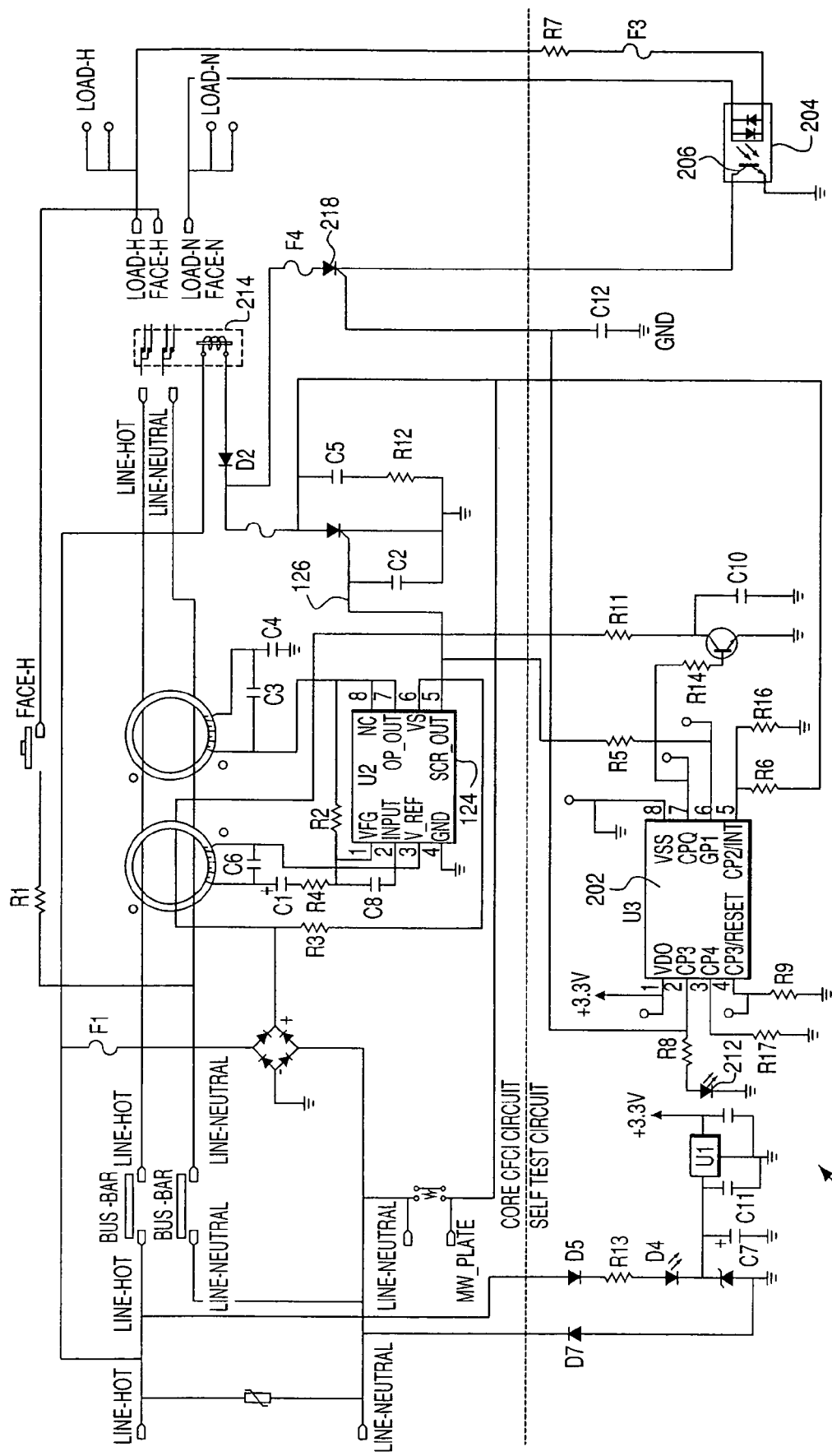
FIG. 2B illustrates a GFCI device having a self-testing ability according to another exemplary embodiment of the present invention.

FIG. 2B illustrates another embodiment of the device 200 shown in FIG. 2A. In the device 200 of FIG. 2B, SCR's 128 and 218 do not have their gates connected, as in FIG. 2A. Rather, the gate of SCR 128 is controlled by the output 126 of ground fault detection circuit 124. The second SCR 218, however, is controlled by output GP5 of the processor 202. Thus, when an end-of-life condition is determined by the processor 202, and the LED 212 is flashed, secondary SCR 218 is turned on. As a result, if contacts 118 fail to open, transistor 206 of optoisolator 204 will be turned on, providing a secondary path for current to flow through relay 214.

Figure 2C:
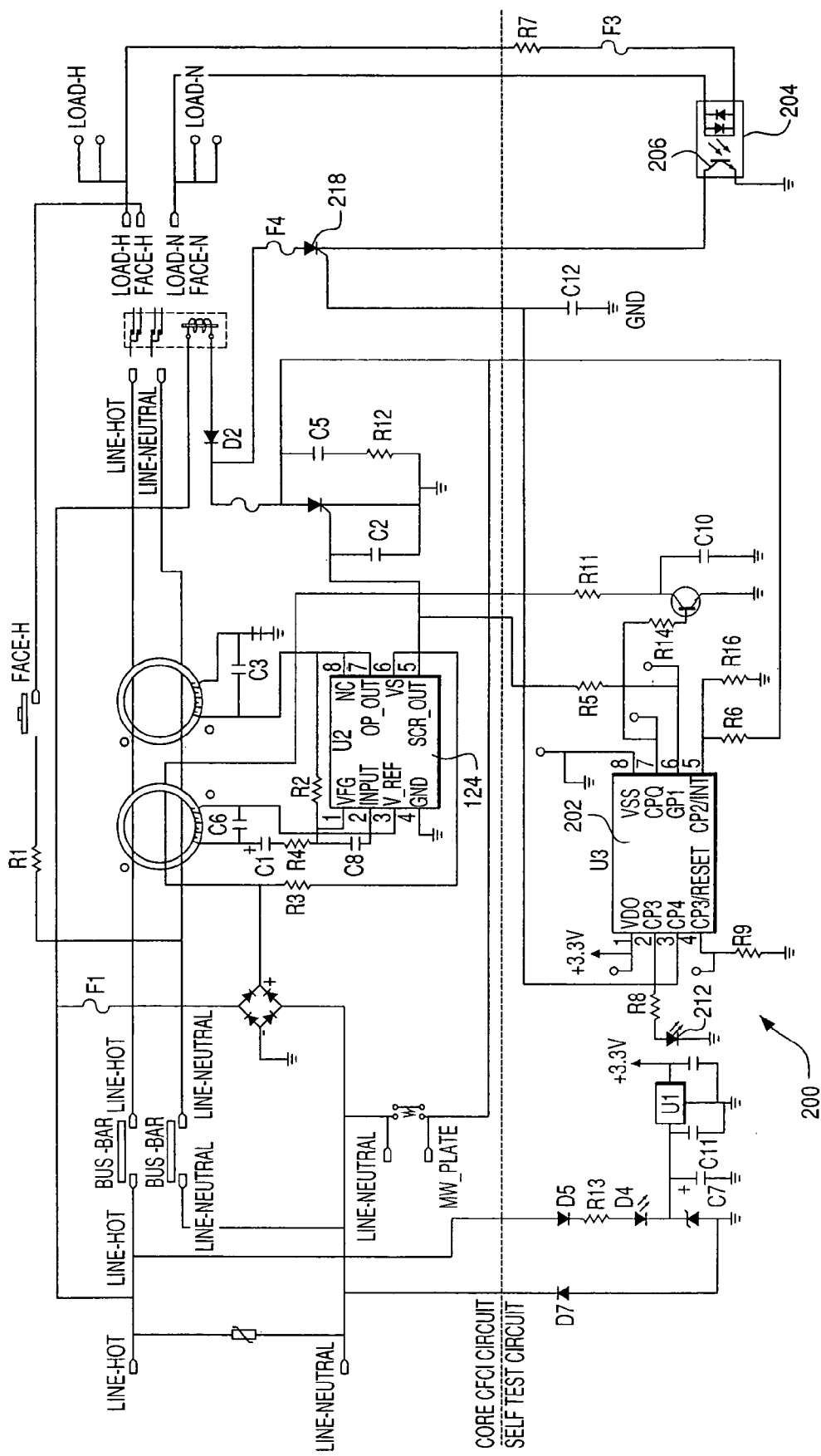
FIG. 2C illustrates a GFCI device having a self-testing ability according to yet another exemplary embodiment of the present invention.

FIG. 2C illustrates another embodiment of the device 200 shown in FIG. 2B. In the device 200 of FIG. 2C, the gate of SCR 218 is controlled by output GP4 of the processor 202.

Figure 5:
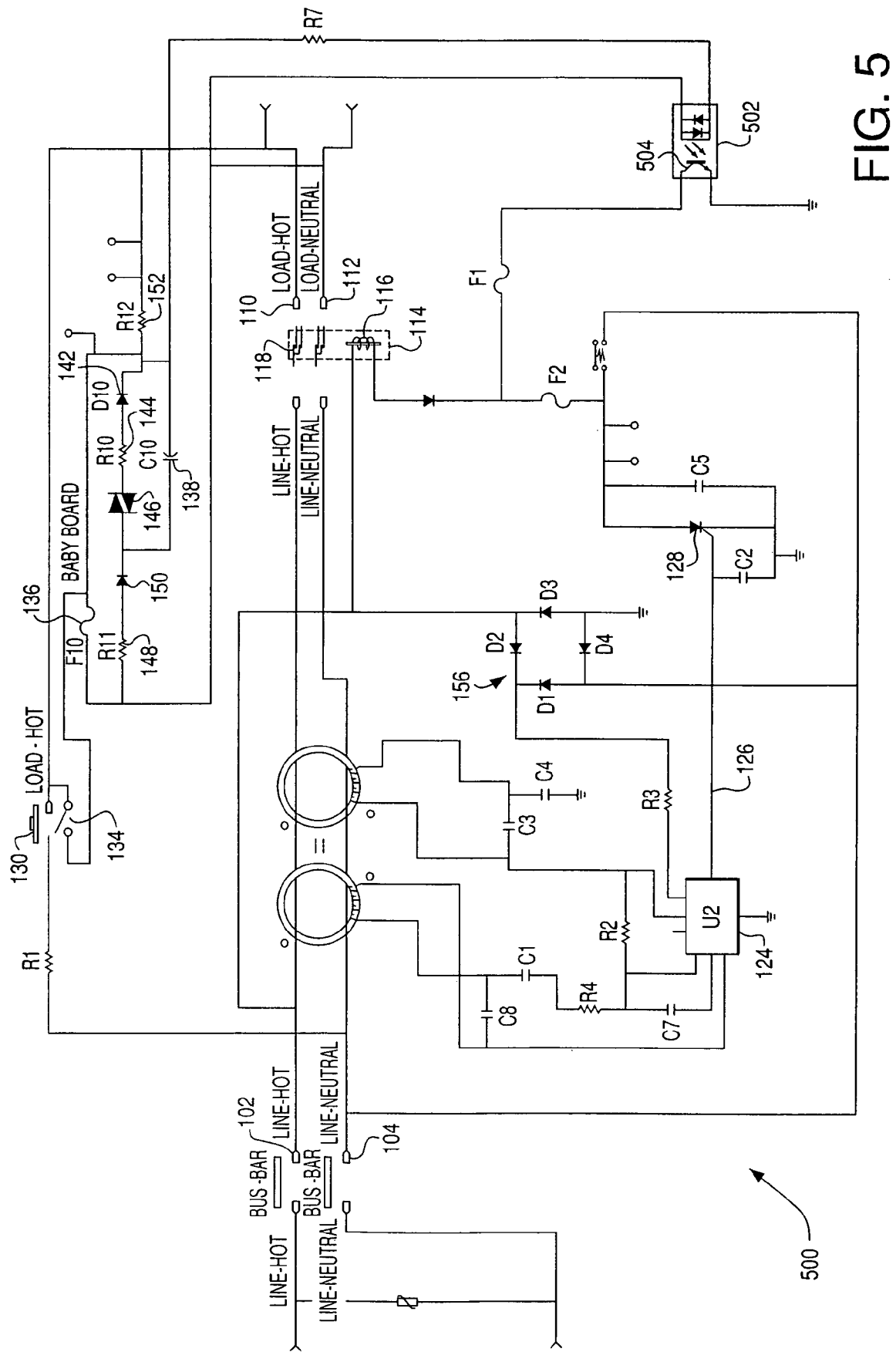
FIG. 5 illustrates a GFCI device according to another exemplary embodiment of the present invention.

FIG. 5 illustrates another embodiment of the present invention. The GFCI device 500 of FIG. 5 is substantially the same as FIG. 1, and so descriptions of the components and features that are the same will not be repeated here. The embodiment of FIG. 5 employs optoisolator 502 as a secondary switching mechanism. If switch 134 is closed, current flows from the load side hot terminal 110 through switch 134 and fuse 136 to the load side neutral terminal. Under normal operation the contacts 118 will open before fuse 136 blows. However, if the contacts 118 remain closed due to welding for example, then fuse 136 will blow. After fuse 136 blows, but while contacts 118 remain closed, current flows from load side neutral terminal 112 through resistor 148, diode 150, diac 146, resistor 144, LED 142 and resistor 152 to the load side hot terminal 110. Transistor 504 is turned on by current flowing in the optoisolator 502. Transistor 504 is in series with coil 116 of relay 114 between the line side hot terminal 102 and ground, thereby providing a secondary switch to energize the coil in the event that SCR 128 fails to function to trip the relay. Once contacts 118 open, optoisolator 502 turns off.

Figure 6:
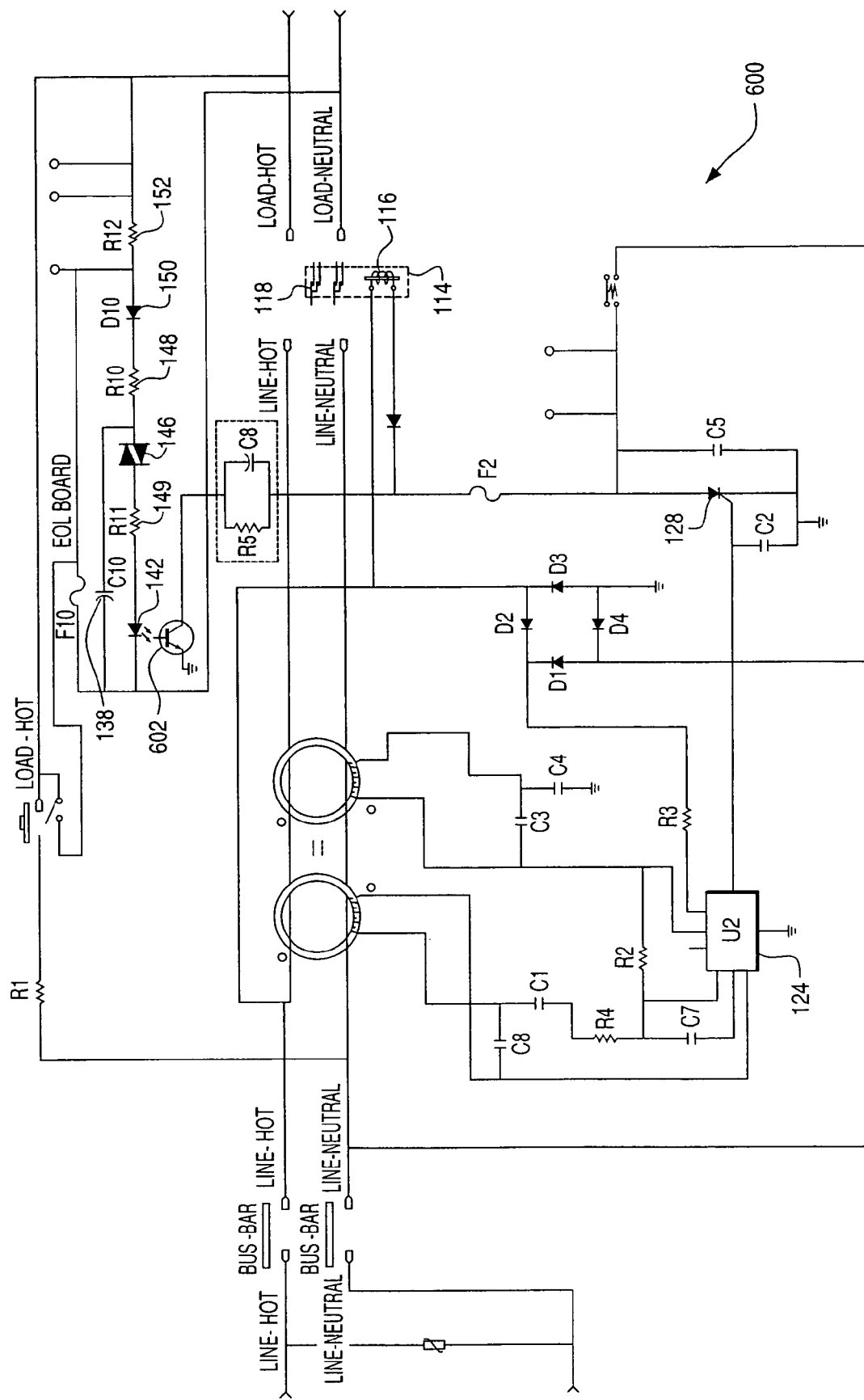
FIG. 6 illustrates a GFCI device according to yet another exemplary embodiment of the present invention.

FIG. 6 illustrates another embodiment of the present invention. The GFCI device 600 of FIG. 6 is substantially the same as FIG. 1, and so descriptions of the components and features that are the same will not be repeated here. The embodiment of FIG. 6 employs and optotransistor 602 to provide a backup path to energize the solenoid 114 in the event that ground fault detecting circuit 124 or SCR 128 fail. If contacts 118 remain closed when switch 134 is closed for a sufficient duration, shunting fuse 136 will blow resulting in an open circuit. Current will then permanently flow through the end-of-life board components 142, 144, 146, 148, 150 and 152, as described above. Optotransistor 602 is turned on by the illuminated LED 142. When optotransistor 602 is turned on, current can flow from the line-side hot terminal 102 through solenoid coil 116, diode D5, RC circuit 604 and optotransistor 602. Thus, if ground fault detecting circuit 124 or SCR 128 fail, a backup mechanism for energizing solenoid 114 and thereby opening contacts 118 is provided.

Figure 7:
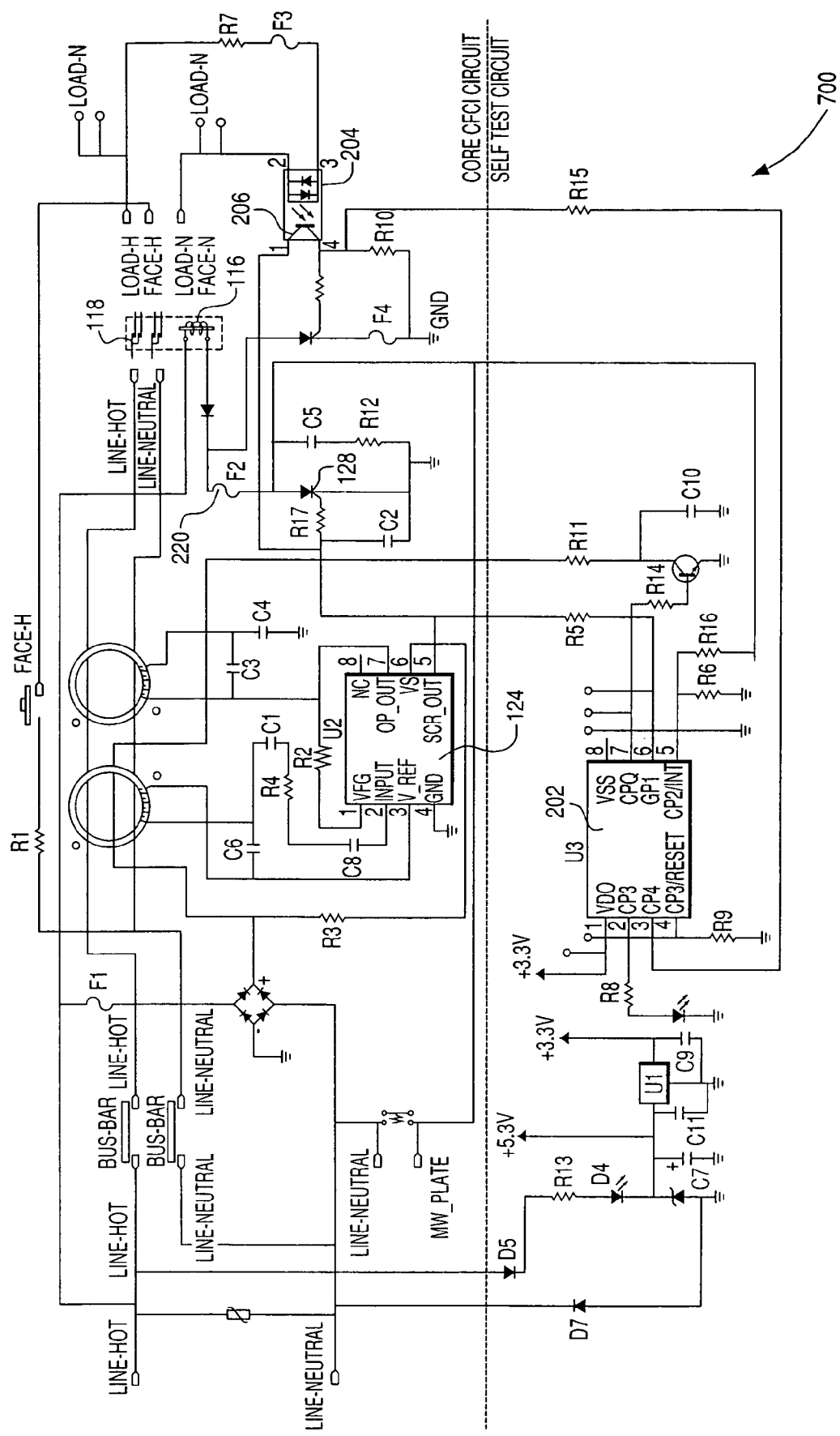
FIG. 7 illustrates a GFCI device having a self-testing ability according to another exemplary embodiment of the present invention.

Now another exemplary embodiment of the present invention will be described with reference to FIG. 7. FIG. 7 shows a self-testing GFCI device 700 similar to the one described with reference to FIG. 2. Optoisolator 204 is connected across the load-side hot 110 and neutral 112 contacts. However, the emitter of transistor 206 is connected to the gate of SCR 218. Thus, SCR 218 is turned on only if ground fault detection circuit 124 output is high and contacts 118 fail to open. The GFCI device 700 of FIG. 7 provides a redundant switching mechanism to energize solenoid 116, in case primary SCR 128 or fuse 220 fail. Input/output GP4 of processor 202 can read the contact 118 status through resistor R15. Input/output GP4 of processor 202 can also trigger SCR 218.

Figure 8:
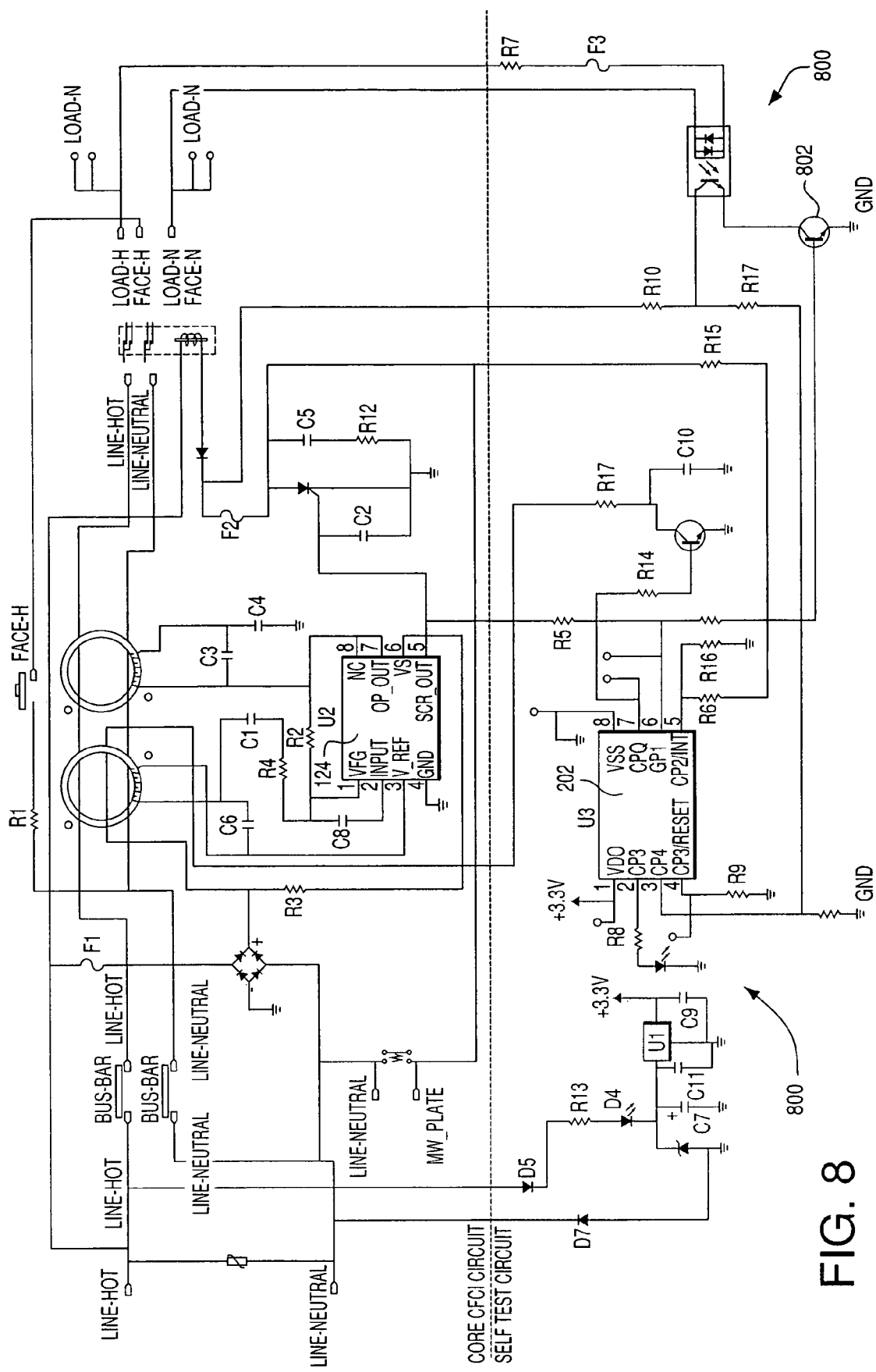
FIG. 8 illustrates a GFCI device having a self-testing ability according to yet another exemplary embodiment of the present invention.
Figure 9:
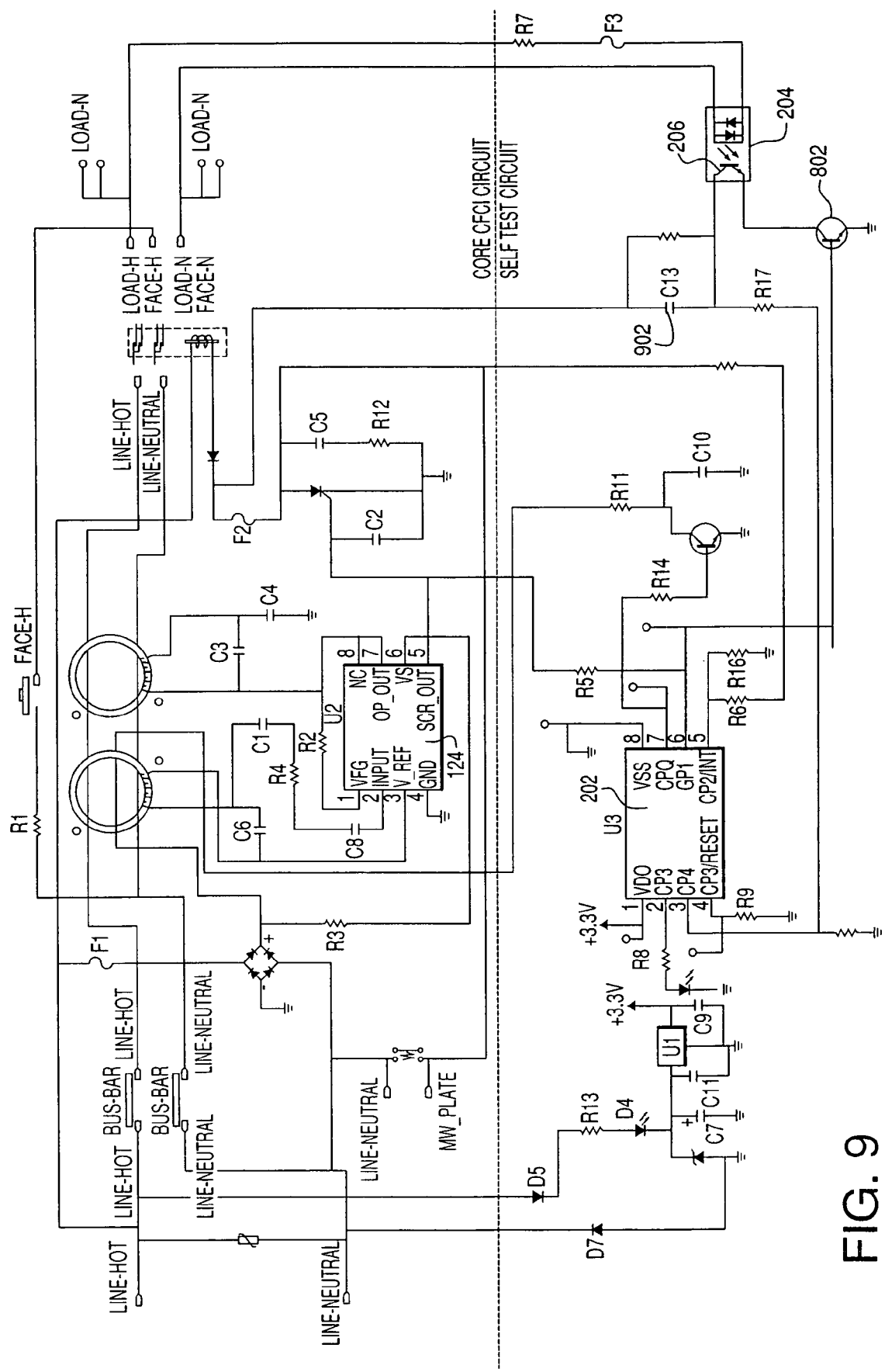
FIG. 9 illustrates a GFCI device having a self-testing ability according to still another exemplary embodiment of the present invention.

Another exemplary embodiment of the present invention will now be described with reference to FIG. 8, which shows a self-testing GFCI device 800 similar to the ones described above with reference to FIGS. 2 and 7. GFCI device 800 replaces the redundant SCR 218 with a transistor 802, which is connected in series with transistor 206 of optoisolator 204. FIG. 9 shows another exemplary embodiment similar to FIG. 8 with an added capacitor 902 which supplies an initial high current to pulse the solenoid 114 when transistor 206 and transistor 802 are turned on.

Figure 10:
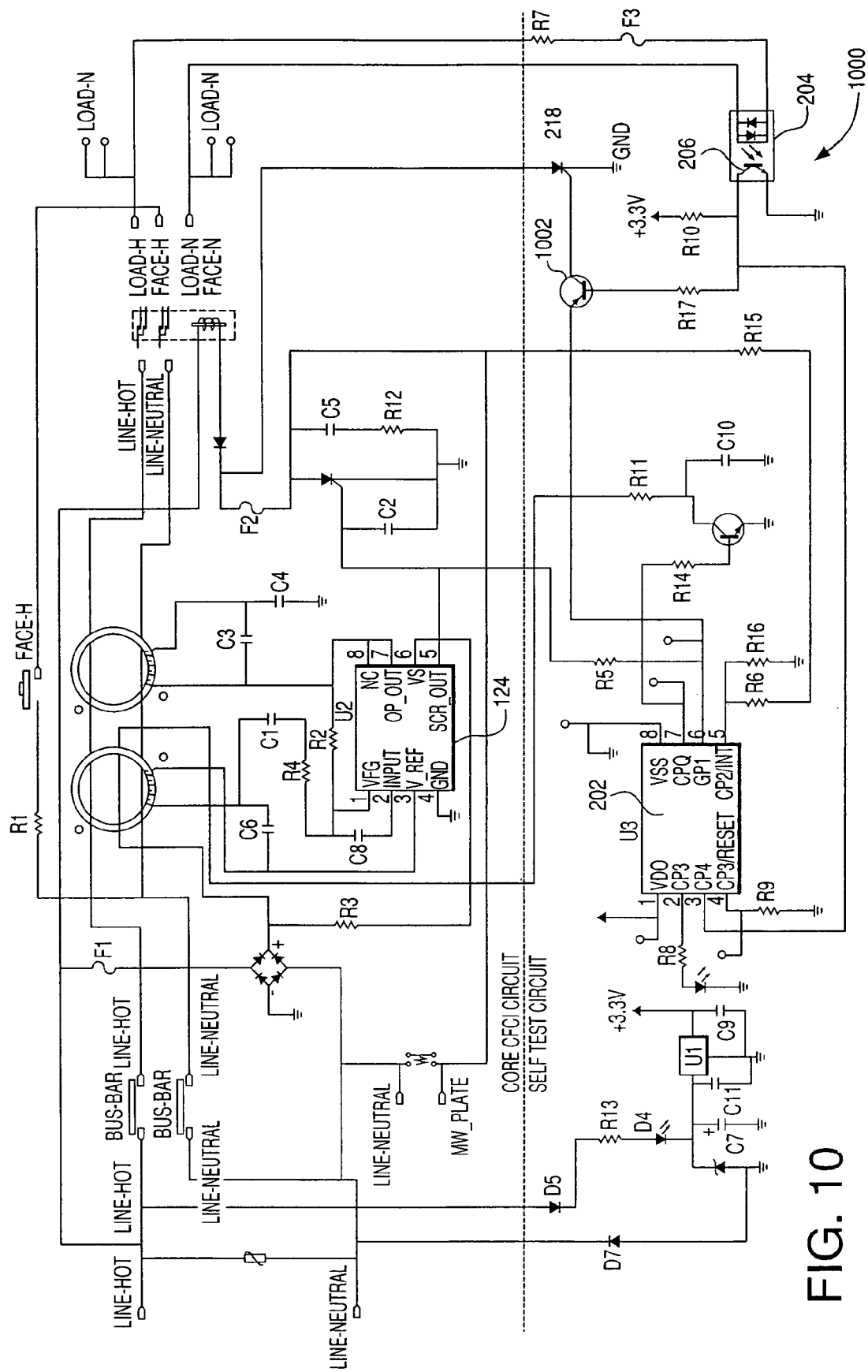
FIG. 10 illustrates a GFCI device having a self-testing ability according to still another exemplary embodiment of the present invention.

Another exemplary embodiment of the present invention is shown in FIG. 10. The GFCI device 1000 shown in FIG. 10 is similar to previously described self-test GFCI's, except that a PNP transistor 1002 provides a gate signal to SCR 218 if optoisolator 204 remains activated after the ground fault detection circuit 124 provides an output pulse.

Figure 11:
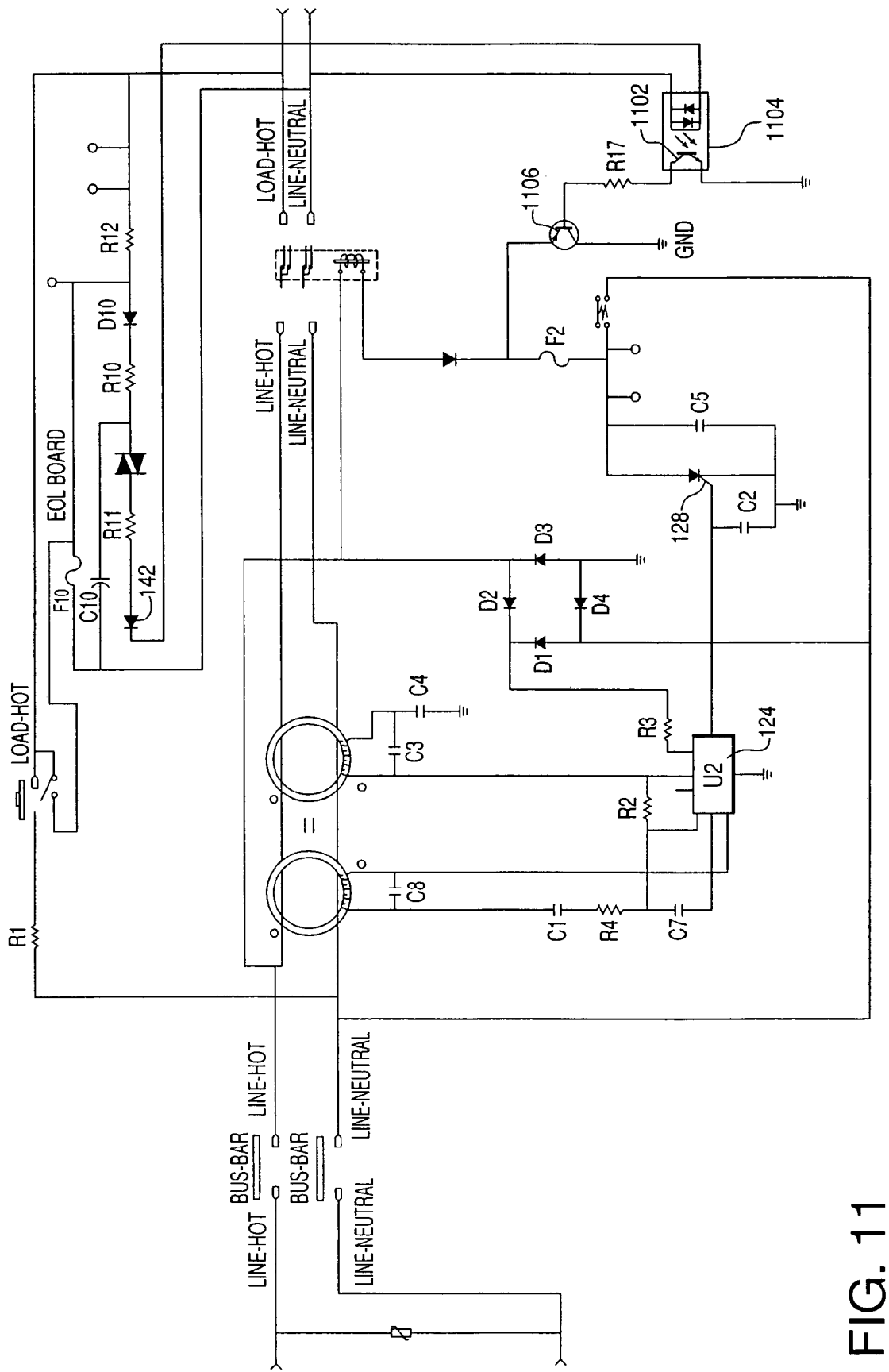
FIG. 11 illustrates a GFCI device according to another exemplary embodiment of the present invention.

FIG. 11 illustrates an exemplary embodiment of a GFCI device 100 similar to the one described with reference to FIG. 1. Descriptions of features and elements of the embodiment of FIG. 11 which are the same as FIG. 1 are omitted for clarity and conciseness. In the GFCI device 100 of FIG. 11, an optoisolator 1102 is connected between LED 142 and the load-side neutral terminal 112. Transistor 1104 of optoisolarot 1102 is connected between ground and the base of PNP transistor 1106. Thus, together, optoisolator 1102 transistor 1104 and transistor 1106 form a second path through which to energize solenoid 114 in the event that ground fault detection circuit 124 or SCR 128 fail.

Figure 12:
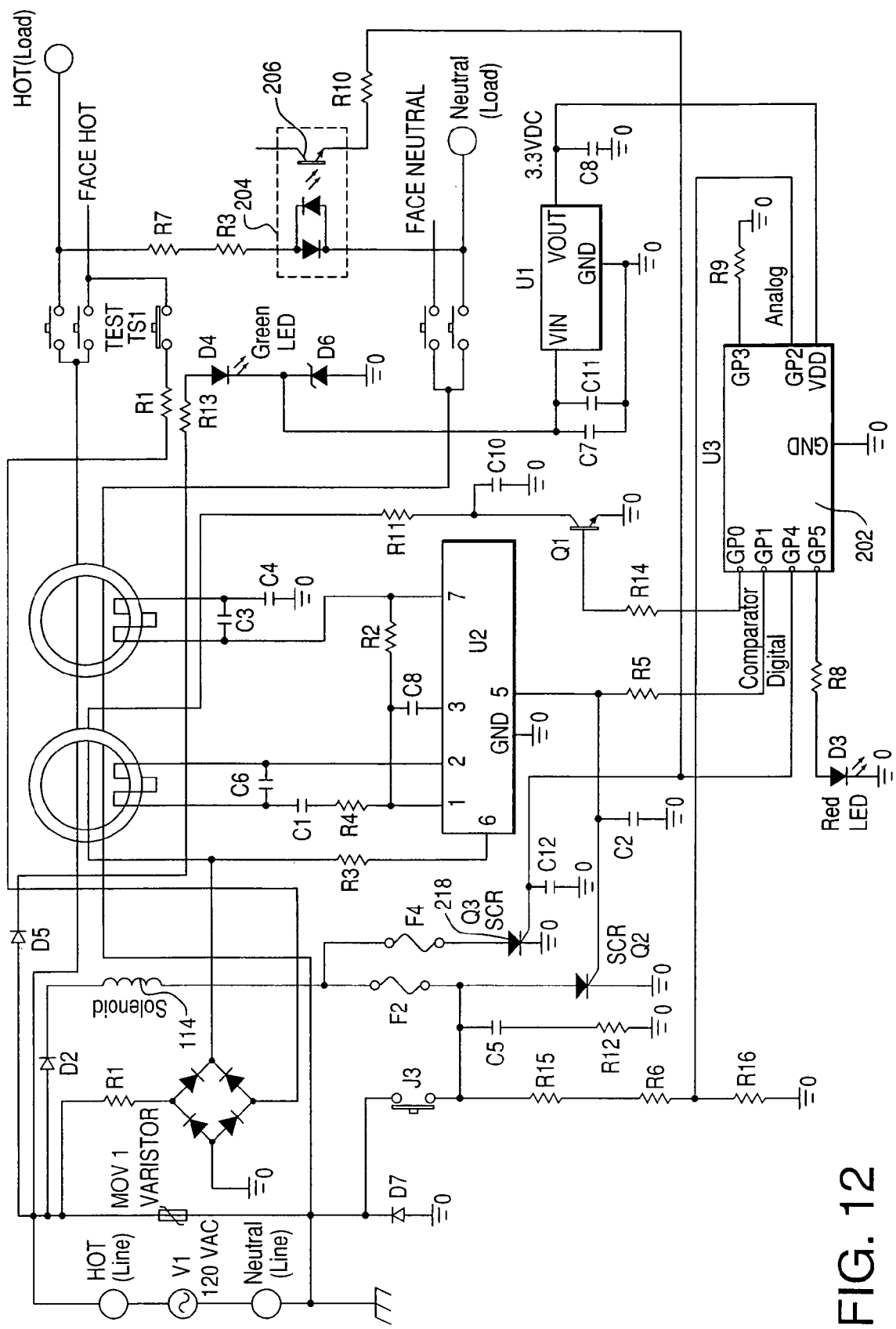
FIG. 12 illustrates a GFCI device having a self-testing ability according to another exemplary embodiment of the present invention.

Another exemplary embodiment of a self-testing GFCI device 200 will now be described with reference to FIG. 12. Descriptions of structures and features of the embodiment shown in FIG. 12 which are the same as the embodiment described above will be omitted for clarity and conciseness. The gate of second SCR 218 is connected to input/output GP4 of processor 202, and also to the emitter terminal of transistor 206 in optoisolator 204. Under normal operating conditions, GP4 of processor 202 outputs a low (i.e. ground) level voltage to inhibit SCR 218. However, if an end-of-life condition is realized, processor 202 applies a high impedance to GP4, such that if optoisolator 206 is turned on (by contacts 118 remaining closed), SCR 218 will be turned on providing a secondary path through which to energize solenoid 114.

Figure 13:
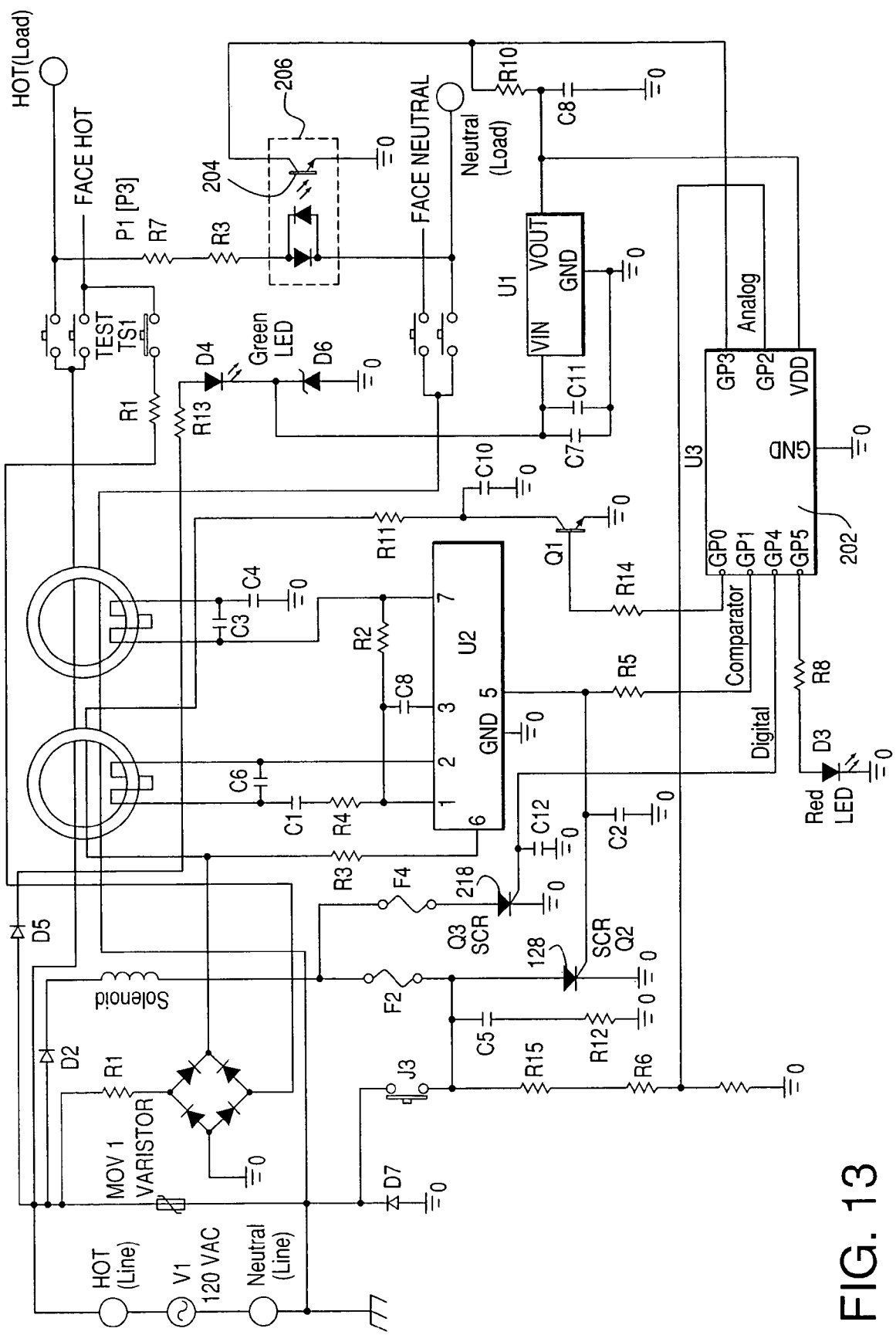
FIG. 13 illustrates a GFCI device having a self-testing ability according to yet another exemplary embodiment of the present invention.

Another exemplary embodiment of the self-testing GFCI device 200 will now be described with reference to FIG. 13. FIG. 13 is similar to the embodiments shown in FIG. 12, except that SCR 218 is directly connected to output GP4 of processor 202, but not to optoisolator 204. The collector terminal of transistor 206 of optoisolator 204 is connected to input GP3 of processor 202. Accordingly, if input GP3 is pulled low by optoisolator being turned on (indicating that contacts 118 are closed) after an end-of-life state is realized, processor 202 asserts a high voltage on output GP4 to turn on SCR 218 and attempt to energize the solenoid 114, even if ground fault detection circuit 124 and/or first SCR 128 have failed.

While the invention herein disclosed has been described by means of specific embodiments and applications thereof, numerous modifications and variations can be made thereto by those skilled in the art without departing from the scope of the invention as set forth in the claims.

What is claimed is:

1. A ground fault circuit interruptor (GFCI) device for detecting an end-of-life condition, comprising:
    line side terminals adapted receive an input power signal;
    load side terminals connectable to a load;
    hot and neutral conductors for connecting respective line side terminals to corresponding load side terminals;
    a ground fault detecting circuit for detecting a fault and controllably operating a switching device to energize a circuit interrupting device to open at least one of the hot and neutral conductors upon detection of a fault; and
    an end-of-life detecting circuit for detecting a failure of the circuit interrupting device to open after detection of the fault, and for activating a secondary circuit to energize the circuit interrupting device on every other half cycle of AC power to open at least one of the hot and neutral conductors if said failure is detected.

2. The GFCI device of claim 1, wherein the switching device is a silicon controlled rectifier (SCR).

3. The GFCI device of claim 1, wherein the circuit interrupting device comprises a solenoid that is energized when the switching device is turned on.

4. The GFCI device of claim 3, further comprising contacts that are opened by the circuit interrupting device.

5. The GFCI device of claim 4, wherein the contacts comprise load, line and face contacts that are isolated when open.

6. The GFCI device of claim 5, wherein the end-of-life detecting circuit comprises an impedance changing device connected between the load-side hot terminal and the load-side neutral terminal when a test switch is closed, said impedance changing device adapted to change from a low impedance to a high impedance if said failure is detected.

7. The GFCI device of claim 6, wherein the impedance changing device is a fuse that blows if sufficient current passes between the load-side hot terminal and the load-side neutral terminal.

8. The GFCI device of claim 6, further comprising an end-of-life circuit that is activated when said impedance changing device changes to said high impedance, said end-of-life circuit comprising an optoisolator that is turned on when said end-of-life circuit is activated and said circuit interrupting device is closed, and wherein said optoisolator comprises a transistor connected in series with a coil of the solenoid to energize said coil while the circuit interrupting device remains closed.

9. The GFCI device of claim 1, wherein the secondary circuit comprises a bilateral trigger diac in series with an optoisolator, said optoisolator providing a power supply current to the switching device when the diac turns on.

10. The GFCI device of claim 9, wherein the power supply current is supplied by a fully rectified diode bridge connected between the hot and neutral conductors.

11. The GFCI device of claim 1, further comprising an optoisolator connected between the load side hot terminal and the load side neutral terminal to determine whether power is connected to said load side terminals.

12. The GFCI device of claim 11, wherein the end-of-life detecting circuit comprises a processor adapted to monitor the ground fault detecting circuit and the optoisolator, and to detect a failure of the circuit interrupting device to open if the state of the optoisolator does not change within a preterm ined time after the ground fault detecting circuit detects a fault.

13. The GFCI device of claim 12, wherein the secondary circuit comprises a second switching device connected to an output of said processor and adapted to energize the circuit interrupting device, and wherein said processor is adapted to controllably switch said second switching device.

14. The GFCI device of claim 13, wherein the second switching device is an SCR.

15. The GFCI device of claim 14, wherein the first and second switching devices are separately switchable by said processor.

16. The GFCI device of claim 14, wherein the second SCR is in series with a transistor of an optoisolator and the circuit interrupting device, said optoisolator connected to the load side terminals such that the transistor conducts while power is applied to the load side through the circuit interrupting device.

17. The GFCI device of claim 16, wherein the circuit interrupting device comprises a solenoid with a relay coil and latchable contacts that are opened when the relay coil is energized.

18. The GFCI device of claim 1, further comprising an LED that is activated when said failure is detected and while said hot and neutral conductors remain closed such that power is provided from said line side terminals to said load side terminals, and wherein said secondary circuit comprises an optotransistor that is gated by said activated LED to energize said circuit interrupting device.

19. The GFCI device of claim 1, further comprising an optoisolator that is turned on after said failure is detected and while power is delivered from said line side terminals to said load side terminals, wherein said secondary circuit comprises a transistor that conducts while said optoisolator is turned on to energize said circuit interrupting device.

20. A method of detecting an end-of-life condition in a ground fault circuit interrupting (GFCI) device comprising the steps of:
   detecting an imbalance between hot and neutral conductors;
   activating a switching device to energize a circuit interrupting device to open at least one of the hot and neutral conductors if said imbalance is detected; and
   activating an end-of-life detecting circuit if said one of the hot and neutral conductors fails to open after activation of the switching device, said end-of-life detecting circuit activating a secondary circuit to energize the circuit interrupting device on every other half cycle of AC power.

21. The method of claim 20, wherein activating said end-of-life detecting circuit comprises blowing a fuse.

22. The method of claim 20, wherein said circuit interrupting device is comprises a relay coil and latchable contacts.

23. The method of claim 20, further comprising detecting whether power continues to be delivered from a line side of said GFCI device to a load side of said GFCI device after the end-of-life detecting circuit is activated, and enabling said secondary circuit to energize the circuit interrupting device until at least one of the hot and neutral conductors are opened by the circuit interrupting device.

* * * * *